(12) United States Patent
Kamijo (10) Patent No.: US 8,749,364 B2
(45) Date of Patent: Jun. 10, 2014

(54) IN-VEHICLE DISPLAY APPARATUS, SERVER, VEHICLE INFORMATION DISPLAY SYSTEM, AND COMMUNICATION METHOD

(71) Applicant: Yusuke Kamijo, Toyota (JP)

(72) Inventor: Yusuke Kamijo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 6 days.

(21) Appl. No.: 13/664,059

(22) Filed: Oct. 30, 2012

(65) Prior Publication Data

US 2013/0106591 A1 May 2, 2013

(30) Foreign Application Priority Data

Nov. 1, 2011 (JP) ................. 2011-239935

(51) Int. Cl.
*B60Q 1/00* (2006.01)
(52) U.S. Cl.
USPC ......... 340/425.5; 340/461; 345/531; 715/771
(58) Field of Classification Search
USPC ........... 340/425.5, 461, 438, 441, 439, 691.6, 340/5.8, 815.78; 701/36; 345/619, 621, 345/625, 531; 715/771
See application file for complete search history.

(56) References Cited

U.S. PATENT DOCUMENTS 7,683,771 B1 * 3/2010 Loeb ............................ 340/461

FOREIGN PATENT DOCUMENTS

| JP | 10297319 A | 11/1998 |
| JP | 10297392 A | 11/1998 |
| JP | 2000-238552 A | 9/2000 |
| JP | 2003-095040 A | 4/2003 |
| JP | 2007-526161 A | 9/2007 |
| WO | 2005-050121 A1 | 9/2005 |

* cited by examiner

*Primary Examiner* — Toan N Pham
(74) *Attorney, Agent, or Firm* — Gifford, Krass, Sprinkle, Anderson & Citkowski, P.C.

(57) ABSTRACT

The in-vehicle display apparatus includes a meter design file storage device, a vehicle data output device, a meter image control device; and a meter image display device. The meter design file storage device is able to store a plurality of meter design files, the meter image control device generates a meter image such that data output from the vehicle data output device is arranged on a meter design expressed by selected at least one of the plurality of meter design files stored in the meter design file storage device, the meter image display device displays the meter image, and at least one of the meter design file storage device and the meter image control device processes only the meter design file that includes authorization data.

9 Claims, 3 Drawing Sheets

FIG. 1

METER DESIGN CREATOR

VEHICLE MAKER

S2 — MANUFACTURE AND SELL VEHICLE EQUIPPED WITH, FOR EXAMPLE, METER DESIGN FILE STORAGE DEVICE 40 THAT IS ABLE TO STORE ONLY METER DESIGN FILE TO WHICH AUTHORIZATION CODE IS ATTACHED

S4 — PROVIDE METER DESIGN CREATING TOOL, INFORMATION ABOUT SPECIFICATIONS, AND CHECKOUT TOOL

S6 — CREATE METER DESIGN FILE AND DETERMINE WHETHER METER DESIGN FILE IS SUITABLE

S8 — TRANSMIT METER DESIGN FILE

S10 — DECIDE TO EMPLOY METER DESIGN FILE SET USAGE CONDITION ATTACH AUTHORIZATION CODE UPLOAD METER DESIGN FILE TO SERVER

FIG. 3

IN-VEHICLE DISPLAY APPARATUS, SERVER, VEHICLE INFORMATION DISPLAY SYSTEM, AND COMMUNICATION METHOD

INCORPORATION BY REFERENCE

The disclosure of Japanese Patent Application No. 2011-239935 filed on Nov. 1, 2011 including the specification, drawings and abstract is incorporated herein by reference in its entirety.

BACKGROUND OF THE INVENTION

1. Field of the Invention

The invention relates to an in-vehicle display apparatus, a server, a vehicle information display system, and a communication method.

2. Description of Related Art

The number of types of data displayed on an in-vehicle display device to notify a user is increasing. There has been developed a display device that indicates, in addition to basic data, such as an engine rotation speed and a remaining amount of fuel, fuel consumption data, data about a distance-to-empty with the remaining amount of fuel, or the like. Hybrid vehicles and electric vehicles are required to notify a user by indicating data of types that are significantly different from those of engine vehicles. Such data are, for example, a battery level, data that indicates whether the vehicle is in power running operation or regenerative operation, and the like.

As matters stand, the above-described pieces of data are displayed on a meter provided by a device maker. A meter design provided by a device maker is fixed, and a meter provided by the device maker is not necessarily easy to see for everyone. Then, a technique that a user creates a meter design has been proposed, and is described in Japanese Patent Application Publication No. 10-297319 (JP 10-297319 A).

In the technique described in JP 10-297319 A, a connector to which a keyboard is connectable is provided at an instrument panel in a cabin. A user creates a meter design by using the keyboard. For example, where a speedometer is arranged in an in-vehicle meter image display device, what size of the speedometer, what design of the speedometer, and the like, are determined. A tachometer, a fuel level gauge, a status indication lamp of a turn signal indicator, and the like, are also similarly designed. Alternatively, it is possible to make a meter design with the use of a mobile computer. In this case, the mobile computer is connected to an in-vehicle computer, and a meter design file is transferred from the mobile computer to the in-vehicle computer. The in-vehicle computer is able to store a plurality of types of meter design files. For example, a meter design file for digitally displaying vehicle data, a meter design file for displaying vehicle data for elderly people, and the like, may be stored in advance, and one of those meter design files may be loaded and displayed on the meter image display device.

With the technique described in JP 10-297319 A, a user is able to create a meter design to be displayed on the meter image display device. In addition, it is possible to store a plurality of types of meter designs in advance and display one of the meter designs, selected from among them.

With the technique described in JP 10-297319 A, the user of a vehicle is able to create a meter design to be displayed on the meter image display device. Recent meters have many display items, and require much time to create a satisfactory meter design. There is a problem that there is no time to create a design or a design is complicated or difficult. There are many users who have complaints with a mono-design provided by a device maker but are also hard to create a design by themselves. The specification provides a technique for eliminating complaints of users who have complaints with a mono-design provided by a device maker but are also hard to create a design by themselves.

It is possible to change a meter design with the technique described in JP 10-297319 A. For example, it is possible to change from a digitally displayed meter design to a meter design for the elderly people. Meter designs have characteristics. Some meter designs are suitable for travelling in urban roads, and others are suitable for travelling on expressways. In the case of JP 10-297319 A, a relationship between a meter design and a characteristic is not taken into consideration, so an appropriate meter design is not always displayed. For example, when an expressway-travelling meter design is selected, the meter design changes to the expressway-travelling meter design even while travelling on an urban road. The reverse phenomenon also occurs.

SUMMARY OF THE INVENTION

A first aspect of the invention provides an in-vehicle display apparatus. The in-vehicle display apparatus includes: a meter design file storage device; a vehicle data output device; a meter image control device; and a meter image display device, wherein the meter design file storage device is able to store a plurality of meter design files, the meter image control device generates a meter image such that data output from the vehicle data output device is arranged on a meter design expressed by selected at least one of the plurality of meter design files stored in the meter design file storage device, the meter image display device displays the meter image, and at least one of the meter design file storage device and the meter image control device processes only the meter design file that includes authorization data.

With the above aspect, a user of the vehicle selects any one of the meter design files stored in the meter design file storage device. Thus, it is possible to select a meter design to be used. The user is able to select a meter design that matches with user's necessity or taste. On the other hand, the selected meter image displayed on the meter image display device is the only meter design authorized by the device maker, so it is possible to utilize an appropriate meter design.

In the above first aspect, the meter design file storage device may at least store a standard meter design file. In addition, the meter image control device may select the standard meter design file at the time of occurrence of a malfunction. With the above aspect, when there occurs a malfunction, a standard meter design having a high reliability is selected, so it is possible to ensure the flexibility of selection of a meter design.

In the first aspect of the invention, it may be determined whether the selected meter design is appropriate in a travelling condition, or the like, at that time, the meter design may be changed to the selected meter design when the selected meter design is appropriate, and the meter design may not be changed to the selected meter design when the selected meter design is inappropriate. The meter design file storage device may store usage conditions respectively in association with the meter design files. In addition, the in-vehicle display apparatus may further include: a change operating device that is operated by a user at the time when a meter design is changed and that is used to select a predetermined meter design; and a change control device that determines whether the data output from the vehicle data output device matches with the usage condition corresponding to the predetermined meter design selected by the user through operation of the change operating device, and, when the data matches with the usage condition, changes the meter design to the predetermined meter design.

In the above first aspect, instead of a manner in which the user operates the change operating device to change the meter design, the user may set a change condition on which the meter design is changed in advance. For example, a condition that the meter design is changed to a high-speed driving meter design when a vehicle speed higher than or equal to 90 km/h continues for a set period of time or longer is set in advance. In this case, the in-vehicle display apparatus may further include: a change condition input device through which a user inputs a change condition on which a meter design is changed to a predetermined meter design; a change condition storage device that stores the input change condition; and a conditioned-response change control device that determines whether the input change condition matches with any one of the usage conditions, wherein, when the change condition matches with any one of the usage conditions, the conditioned-response change control device may store the change condition in the change condition storage device, and, when the change condition is satisfied, the conditioned-response change control device may change the meter design to the predetermined meter design. With the above first aspect, only an appropriate change condition is stored in the change condition storage device for a meter design.

In the above first aspect, a communication device that communicates with a server to download the meter design files to the meter design file storage device may be a device that is temporarily (for example, at the time of a visit to a vehicle dealer) connected to the meter design file storage device, or the like, or may be mounted on the vehicle.

A second aspect of the invention provides a server managed by a device maker. The server includes: a communication device through which a plurality of meter design files that include data indicating that the device maker has authorized are uploaded to the server, wherein the uploaded meter design files in the server are downloaded to an in-vehicle meter design file storage device via the communication device.

In the second aspect, usage conditions may be respectively stored in association with the uploaded meter design files.

A third aspect of the invention provides a communication method used in a system in which a first computer managed by a device maker, a second computer managed by a meter design creator and an in-vehicle computer are connected via a communication network. The communication method includes: transmitting a first electronic information for creating a meter design information, and a second electronic information, which determines whether a generated meter design information is suitable, from the first computer to the second computer; transmitting a meter design information that is generated based on the first electronic information and determined as suitable by using the second electronic information, from the second computer to the first computer; storing the meter design information in the first computer in such a manner that the meter design information is able to be transmitted to the in-vehicle computer, when the meter design information is authorized by the device maker, to the first computer; and transmitting the meter design information, corresponding to a request from a vehicle side, from the first computer to the in-vehicle computer.

With the above third aspect, the user of the vehicle is able to select a meter design. The user who has complaints with a mono-design provided by the device maker is able to select a meter design that matches with user's necessity or taste. At the same time, a displayable meter design is limited to the meter design authorized by the device maker, and is limited to a reliable meter design. It is possible to select an appropriate meter design in consideration of the feature, and the like, of the vehicle. When usage conditions are respectively stored in association with the meter design files, an appropriate meter design is selected and displayed in connection with a travelling state, and the like.

A fourth aspect of the invention provides a vehicle information display system. The vehicle information display system includes: a server that stores meter design information that combines a meter design with an authorization code; a control device that receives the meter design information from the server and that outputs only specified information; a storage device that stores the specified information output from the control device; a display image generating device that generates a display image on the basis of the specified information stored in the storage device; and a display device that displays the display image, wherein, when the authorization code included in the meter design information is proper, the control device outputs the meter design as the specified information.

With the above fourth aspect, the meter image displayed on the display device uses the meter design authorized by the device maker, so it is possible to use the appropriate meter design.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiment

In the present embodiment, a technique for selecting and displaying an appropriate meter design will be described. Here, the meanings of terms used in the present embodiment will be explained. A meter image display device is an image display device that is mounted on a vehicle at a position at which a user of the vehicle is able to visually recognize the image display device. The meter image display device is usually incorporated in an instrument panel. The meter image display device is able to change a display image in accordance with electronic information as in the case of a liquid crystal display, a plasma display, or the like. A meter design is an image that is a background of data display. For example, in the case of a speedometer, the meter design is an image other than an image of a needle that indicates a speed, that is, an image of a portion corresponding to a dial plate of a clock. In the case of an indicator that is in synchronization with a turn signal indicator, the meter design is an image that shows an arrow with a size at a position. A meter design file is electronic information that describes a meter design. A meter image is an image that includes a vehicle data display image with a meter design, and is displayed on the meter image display device. For example, when the travelling speed is 50 km/h, the meter image is displayed by superimposing the image of a needle, which points the position of 50 km/h, on the image of a dial plate described by a meter design. A meter image control device is a device that creates meter image data by superimposing a vehicle data display image on a meter design described by a meter design file and that displays a created meter image on the meter image display device. The meter image control device is mounted on the vehicle. A design is to create a meter design. A designer is a person or party that creates a meter design. A device maker is a maker that is in charge of developing and designing the whole or part of a meter design file storage device, a vehicle data output device, the meter image control device and the meter image display device. The device maker is not limited to a finished car maker and may be a parts maker. In addition, the vehicle according to the invention includes an automobile that travels by using an engine, a hybrid vehicle, an electric vehicle, a fuel-cell vehicle, a motorcycle, an electric power-assisted bicycle, and the like.

Figure 1:
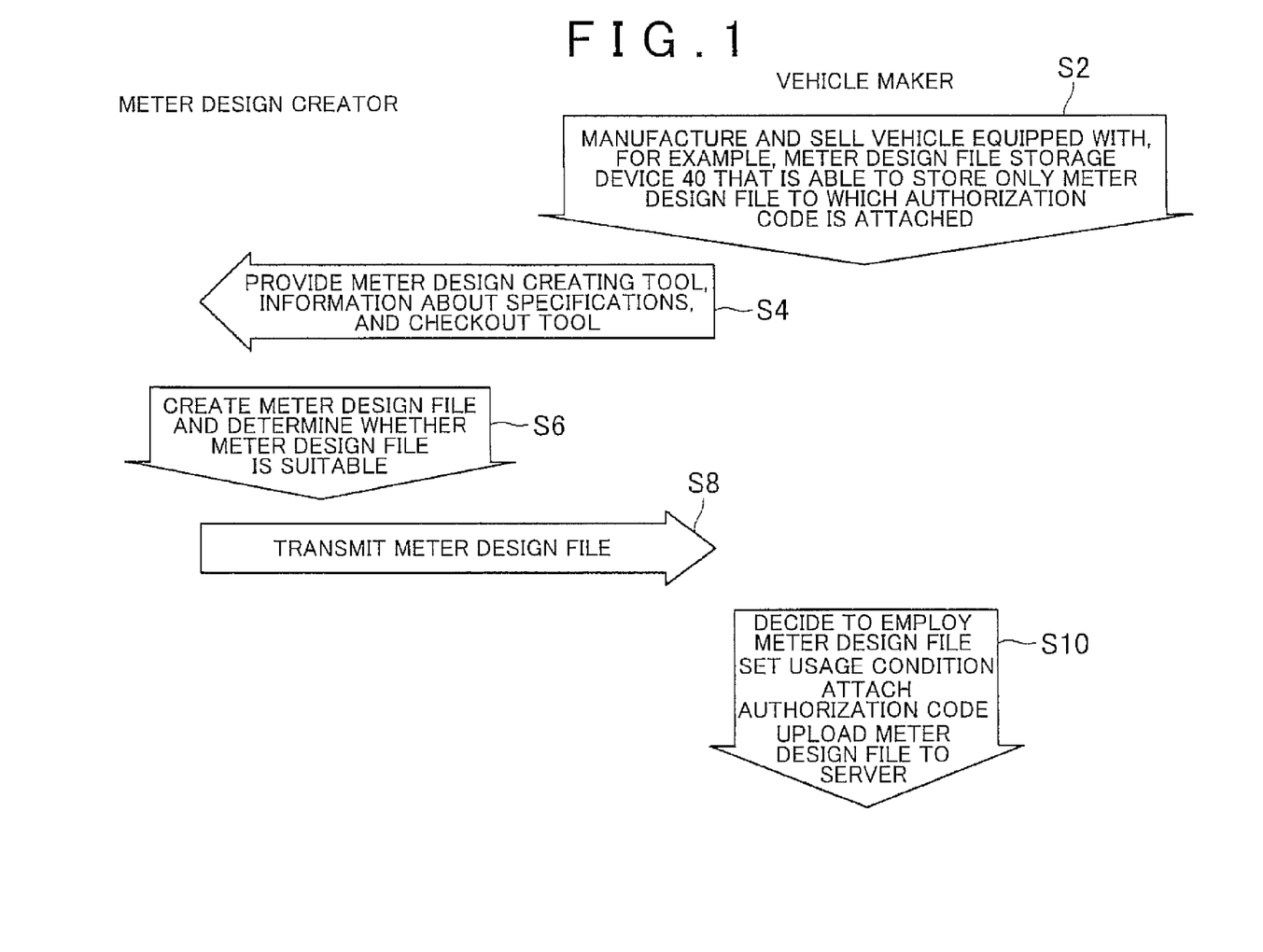
FIG. 1 shows processes performed by a vehicle maker and a meter design creator.

FIG. 1 shows processes performed by a vehicle maker and a meter design creator. First, the vehicle maker manufactures and sells a vehicle equipped with an in-vehicle display apparatus 20 shown in FIG. 2 (S2). The in-vehicle display apparatus 20 includes a meter design file storage device 40 that stores only a meter design file authorized by the vehicle maker. The meter design file storage device 40 is not able to store a meter design file that is not authorized by the vehicle maker. Subsequently, the vehicle maker provides the meter design creator with a meter design creating tool (meter design creating software), technical information (information about specifications) that should be followed at the time of creating a meter design, and a checkout tool (checkout software) that is able to examine whether a created meter design fulfills the specifications requested by laws and regulations, and the like (S4). The technical information and the tools may be provided for only a preliminary registered meter design creator. The vehicle maker may charge for the information and the tools to be provided. Subsequently, the meter design creator creates a meter design file and determines whether the meter design file is suitable with the use of the checkout tool (S6). After that, the meter design creator transmits the meter design file to the vehicle maker (S8). At this time, only the meter design file that has been determined to be suitable by the checkout tool may be transmitted to the vehicle maker. Through the above processes, a person or party other than the vehicle maker is allowed to create a meter design, and various meter designs are created.

Finally, the meter design transmitted to the vehicle maker is evaluated by the vehicle maker, and the vehicle maker decides whether to employ the transmitted meter design. In process of this evaluation, for example, operation may be checked at the time when an image indicating vehicle data is superimposed on the meter design to form a meter image, and it may be evaluated whether the meter design conforms to the characteristic and feature of the vehicle. At the time of evaluation, the vehicle maker studies whether the meter design has a usage condition, and, when the meter design has a usage condition, the usage condition is stored in association with the meter design file. For example, a condition that "the travelling speed is higher than or equal to a predetermined speed" is attached to a meter design that is suitable for high-speed driving and that is not suitable for low-speed driving. Alternatively, a condition that "the location of a host vehicle falls within a specified area" is attached to a specified area meter design. A condition that "an eco-mode is selected" is attached to a meter design that highlights an index related to a fuel consumption. An authorization code that indicates that the vehicle maker has authorized a meter design file is attached to the meter design file that has been decided to be employed through the evaluation of the vehicle maker. The meter design file that the vehicle maker has decided to employ is uploaded to a server together with the authorization code. If a usage condition is set, the usage condition is also uploaded (S10).

Other than the meter design file created by the meter design creator, a standard meter design file created by the vehicle maker is also uploaded to the server. Usage condition constraints do not need to be attached to the standard meter design file. By so doing, a standard meter design is usable in any situations.

Figure 2:
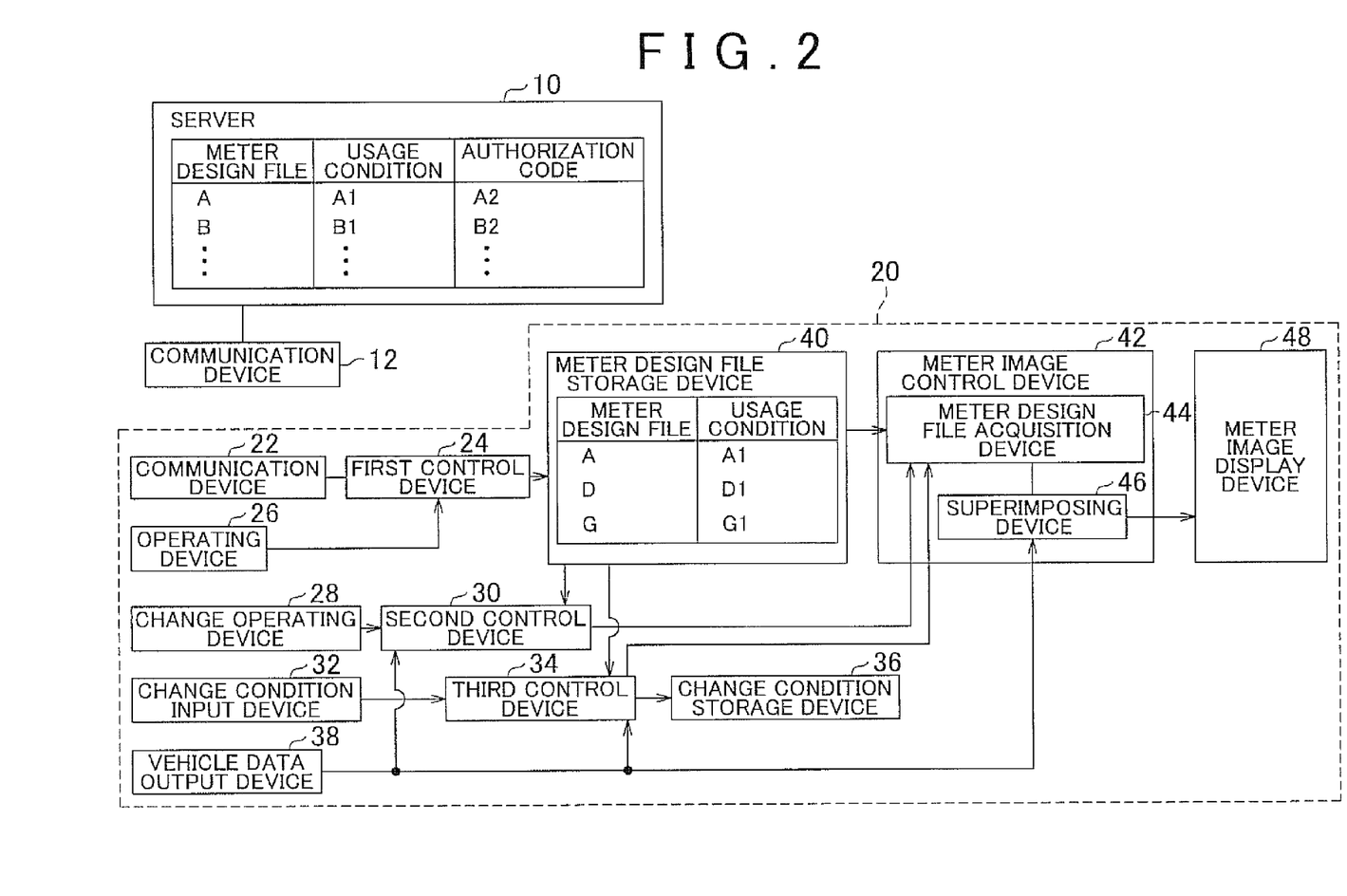
FIG. 2 shows a server of the vehicle maker and the overall configuration of an in-vehicle display apparatus.

In FIG. 2, the server 10 managed by the vehicle maker stores meter design files, usage conditions and authorization codes (data that indicate that the vehicle maker has authorized a meter design file) in association with one another. In FIG. 2, the meter design file A, the corresponding usage condition A1 and the authorization code A2 are stored in association with one another. There are many types of meter design file, and the server 10 is able to provide various meter designs. The server 10 managed by the vehicle maker transmits a meter design file, a corresponding usage condition and a corresponding authorization code to the in-vehicle display apparatus 20 via a communication device 12.

The in-vehicle display apparatus 20 includes devices shown in FIG. 2. A communication device 22 carries out data communication with the server 10 via the communication device 12. A first control device 24 is connected to the communication device 22, and an operating device 26 is connected to the communication device 22 via the first control device 24. A user of the vehicle selects a meter design with the use of the operating device 26. The first control device 24 acquires the meter design file, the usage condition and the authorization code, corresponding to the selected meter design, from the server 10 via the communication device 12 and the communication device 22. The first control device 24 refers to the authorization code attached to the meter design file received via the communication device 22, and determines whether the meter design file is authorized by the vehicle maker. When it is determined that the received meter design file is authorized by the vehicle maker, the first control device 24 transmits the meter design file and the associated usage condition to the meter design file storage device 40. That is, only meter design files authorized by the vehicle maker are stored in the meter design file storage device 40. The case of FIG. 2 illustrates an example in which the user selects meter designs A, D and G and downloads the meter designs A, D and G into the meter design file storage device 40.

The meter design files and the associated usage conditions are stored in the meter design file storage device 40. At this time, authorization codes are not stored in the meter design file storage device 40. By so doing, it is possible to prevent illegal usage on an in-vehicle display apparatus 20 mounted on another vehicle. That is, even when the meter design files stored in the meter design file storage device 40 are attempted to be recorded in the in-vehicle display apparatus 20 mounted on another vehicle, because a first control device 24 of the another vehicle does not determine that the meter design files are authorized, it is not allowed to record the meter design files in a meter design file storage device 40 of the another vehicle. Thus, each vehicle is required to download meter design files from the server 10 to the meter design file storage device 40. In addition, the vehicle maker may charge a user for a usage fee of a meter design when the meter design is downloaded to the meter design file storage device 40.

In addition, an authorization code that indicates that the vehicle maker has authorized a meter design may be generated by various encryption technologies. For example, a key is assigned to both the server 10 and the in-vehicle display apparatus 20, and, when data decoded with the use of the key indicates specific information, it may be determined that a proper authorization code is attached. In addition, an authorization code may be generated through electronic authentication.

A meter image control device 42 includes a meter design file acquisition device 44 and a superimposing device 46. The meter design file acquisition device 44 is connected to a second control device 30, a third control device 34, the meter design file storage device 40 and the superimposing device 46. The meter design file acquisition device 44 acquires one meter design file from among the plurality of meter design files stored in the meter design file storage device 40, and transmits the acquired meter design file to the superimposing device 46. Vehicle data output from a vehicle data output device 38 is input in the superimposing device 46. The superimposing device 46 generates display data that indicates the vehicle data, and creates a meter image by superimposing the display data indicating the vehicle data on the meter design file transmitted from the meter design file acquisition device 44. Note that the display data indicating the vehicle data may be generated not by the superimposing device 46 but the vehicle data output device 38 and transmitted to the superimposing device 46. A meter image display device 48 displays a meter image received from the superimposing device 46. For example, when the vehicle data output from the vehicle data output device 38 is an engine rotation speed 3000 rpm, display data of the needle that points the position of 3000 rpm, generated by the superimposing device 46, is superimposed on the dial plate (meter design) of the tachometer, acquired by the meter design file acquisition device 44, and the meter image displayed on the meter image display device 48 is created.

Additionally, the meter design file acquisition device 44 acquires the standard meter design file when the meter design file acquisition device 44 detects an occurrence of a malfunction of the meter image displaying on the meter image display device 48. The stability of display can be improved by using the standard meter design file when malfunction of the meter image occurs. Also, the meter design file acquisition device 44 acquires the standard meter design file when the meter design file acquisition device 44 detects an occurrence of a malfunction of the in-vehicle device. That is, in-vehicle display apparatus 20 can be displayed in the same form as the notification of the malfunction of the in-vehicle device by using the standard meter design file. As a result, the user visibility regarding malfunction of the in-vehicle device can be improved. In addition, any method of detecting a malfunction of the meter image or the in-vehicle device can be used. For example, the malfunction may be detected by the meter design file acquisition device 44 or by other in-vehicle device. The information about malfunction may be transmitted from other in-vehicle device to the meter design file acquisition device 44 in case of detecting by other in-vehicle device.

The in-vehicle display apparatus 20 includes a change operating device 28 and the second control device 30. The change operating device 28 is operated by the user of the vehicle to change a meter design. For example, each time the user operates the change operating device 28, the meter design files stored in the meter design file storage device 40 are sequentially selected. In the case of FIG. 2, each time the user operates the change operating device 28, the meter design file is selected in order of A, D, G and A.

The change operating device 28, the vehicle data output device 38 and the meter design file storage device 40 are connected to the second control device 30. The second control device 30 compares the usage condition of the meter design file selected by the user of the vehicle through operation of the change operating device 28 with output data from the vehicle data output device 38, and determines whether the usage condition is satisfied. When the usage condition is satisfied, the second control device 30 provides information about the selected meter design file to the meter design file acquisition device 44. The meter design file acquisition device 44 acquires the selected meter design file from among the meter design files stored in the meter design file storage device 40 on the basis of the information provided from the second control device 30. For example, when the meter design file A of which the usage condition is higher than or equal to a predetermined speed (meter design suitable for high-speed driving) is selected, and when the vehicle is travelling below the predetermined speed, the second control device 30 determines that the usage condition is not satisfied, and does not change the meter design. That is, the same meter design is continuously displayed. At this time, the user of the vehicle may be notified through indication on the meter image display device 48 that the usage condition is not satisfied. When the vehicle is travelling at the predetermined speed or above at the time when the meter design file A is selected, it is determined that the usage condition is satisfied, and the meter design is changed to the meter design based on the meter design file A selected by the user. The second control device 30 according to the present embodiment may be regarded as a change control device according to the invention.

The in-vehicle display apparatus 20 includes a change condition input device 32, the third control device 34 and a change condition storage device 36. The third control device 34 is connected to the change condition input device 32, the change condition storage device 36, the vehicle data output device 38, the meter design file storage device 40 and the meter design file acquisition device 44. The user of the vehicle operates the change condition input device 32 to input a desired meter design and a change condition on which the meter design is changed to the desired meter design. For example, as a change condition on which the meter design is changed to a meter design based on the meter design file G, a condition that the host vehicle falls within a predetermined area may be set. The third control device 34 acquires the usage condition of the meter design file, input to the change condition input device 32, from the meter design file storage device 40. Then, the third control device 34 compares the change condition, input to the change condition input device 32, with the usage condition of the input meter design file, and determines whether the input change condition satisfies the usage condition. When the usage condition is satisfied, the third control device 34 transmits the corresponding meter design file and its change condition to the change condition storage device 36, and stores the meter design file and its change condition. The third control device 34 compares the condition stored in the change condition storage device 36 with the vehicle data output from the vehicle data output device 38, and monitors whether the predetermined change condition is satisfied. When it is determined that the change condition is satisfied, the third control device 34 provides information about the meter design, of which the change condition is satisfied, to the meter design file acquisition device 44. The meter design file acquisition device 44 acquires the meter design file from the meter design file storage device 40 on the basis of the provided information about the meter design, and transmits the meter design file to the superimposing device 46. The superimposing device 46 generates a meter image from the acquired meter design file and the vehicle data from the vehicle data output device 38. By so doing, the display screen is changed to the meter design of which the change condition is satisfied. For example, when it is determined by an in-vehicle GPS device, or the like, that the host vehicle is present within a predetermined driving area, it is determined that the change condition on which the meter design is changed to the meter design based on the meter design file G is satisfied, and the meter design file G is provided to the meter design file acquisition device 44. As a result, the meter image screen is changed to the meter design based on the meter design file G. The third control device 34 according to the present embodiment may be regarded as a conditioned-response change control device.

Figure 3:
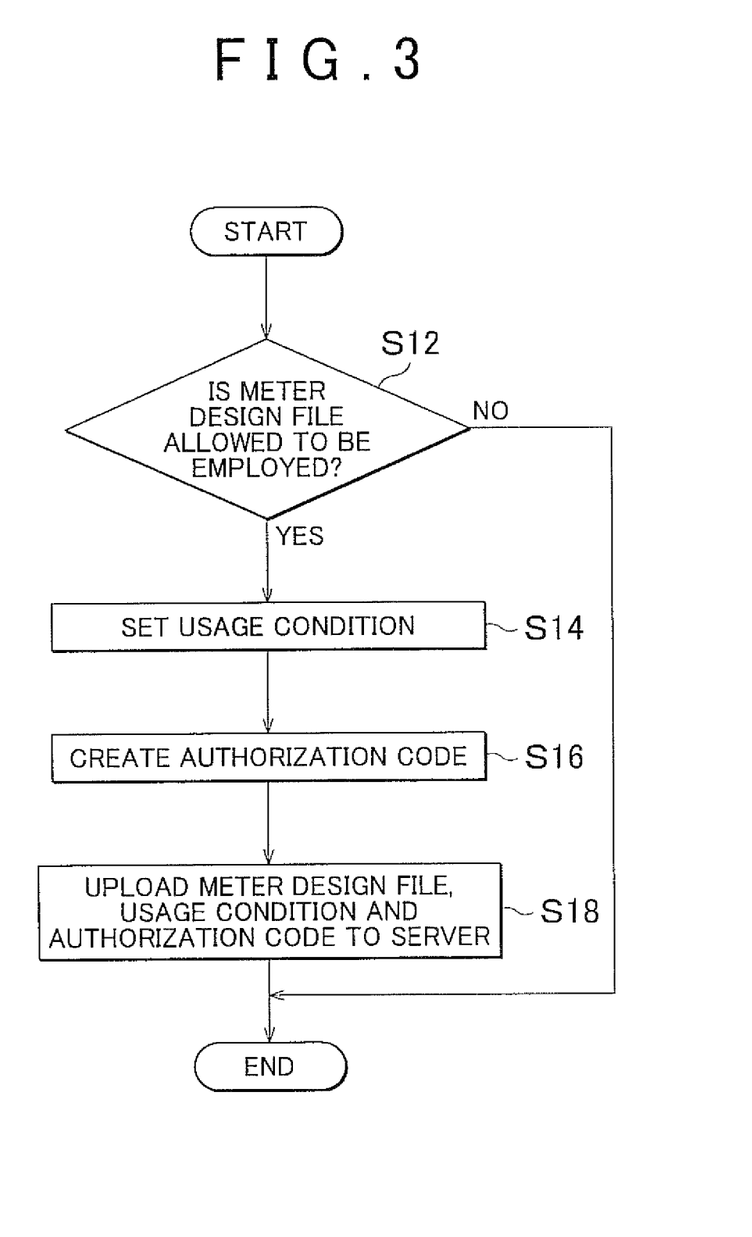
FIG. 3 is a flowchart at the time of uploading a meter design file to the server.

FIG. 3 shows a procedure in which the vehicle maker uploads data to the server 10. First, a meter design file transmitted from a meter design creator is evaluated on the basis of criteria set by the vehicle maker, and it is decided whether to employ the meter design file (S12). When it is decided not to employ the meter design file (NO in S12), the following processes are not executed. Subsequently, when it is decided to employ the meter design file (YES in S12), it is determined whether the usage condition of the meter design file is limited, and, when the usage condition is limited, the usage condition is set (S14). After that, an authorization code attached to the meter design file is created (S16). For example, a signature of the vehicle maker may be used as the authorization code. Finally, the meter design file that the vehicle maker decides to employ, the usage condition and the authorization code are uploaded to the server in association with one another (S18). After completion of the above processes, the server waits for access from an in-vehicle computer.

The user of the vehicle accesses to the server 10 with the use of the communication device 22. The communication device 22 may be removable from the in-vehicle display apparatus 20. By so doing, for example, it is applicable that the communication device 22 is prepared at a vehicle dealer and the communication device 22 is connected to the in-vehicle display apparatus 20 at the time when the user comes to the dealer to download meter design files. Alternatively, it is applicable that the communication device 22 is mounted on the vehicle and the user of the vehicle is allowed to download meter design files. Alternatively, contents that are allowed to be downloaded by the user of the vehicle may be limited. For example, it is applicable that the user of the vehicle is allowed to download an update version of a downloaded meter design file.

The first control device 24 analyzes the authorization code and, only when it is determined that the meter design file is transmitted from the vehicle maker, stores the meter design file in the meter design file storage device 40. Thus, a meter design file of unknown origin is not stored in the meter design file storage device 40. The user is able to utilize an authorized meter design file.

At the time of managing the above-described system, the usage of the system may charge for a fee. For example, in step S2 of FIG. 1, a price is paid by the meter design creator to the vehicle maker. The meter design creator pays to the vehicle maker for the evaluation made by the vehicle maker in step S10 of FIG. 1. The vehicle maker pays to the meter design creator at the time when the vehicle maker uploads a meter design file to the server in step S10 of FIG. 1. Alternatively, the user of the vehicle pays to the vehicle maker and/or the meter design creator at the time when the user downloads a meter design file into the meter design file storage device 40. Alternatively, the user of the vehicle pays to the vehicle maker and/or the meter design creator at the time when the user selects a meter design file from the meter design file storage device 40. The system may be managed by charging such fees.

The examples of the invention are described in detail above; however, the examples are just illustrative and do not limit the scope of the appended claims. The techniques described in the appended claims encompass various modifications, alterations and improvements of the above-illustrated examples.

For example, in the above-described embodiment, the vehicle maker manages the server and the system; instead, a parts maker that is in charge of developing and designing or manufacturing the display device may manage the server and the system. The vehicle maker and the parts maker may manage the server and the system in cooperation with each other. These makers are able to evaluate whether a meter design is safely usable by a user. In addition, in the above-described embodiment, only a meter design file attached with an authorization code is stored in the meter design file storage device 40. Instead, only a meter design file attached with an authorization code may be acquired at the time when a meter design file is processed in the meter image control device 42. In addition, when the meter image control device 42 acquires a meter design file, the meter image control device 42 may acquire two or more meter design files. For example, it is applicable that a meter design file that indicates engine operation information, a meter design file that indicates a state of gear and a meter design file that indicates flow of current are acquired and those are superimposed together to generate a meter design.

In addition, the technical elements described in the specification or the drawings exercise technical usability alone or in various combinations, and are not limited to a combination recited in the appended claims at the time of filing. In addition, the technique illustrated in the specification or the drawings achieves multiple purposes at a time, and has a technical usability by achieving one of those multiple purposes.

What is claimed is:

1. An in-vehicle display apparatus comprising:
a meter design file storage device;
a vehicle data output device;
a meter image control device; and
a meter image display device, wherein
the meter design file storage device is able to store a plurality of meter design files,
the meter image control device generates a meter image such that data output from the vehicle data output device is arranged on a meter design expressed by selected at least one of the plurality of meter design files stored in the meter design file storage device,
the meter image display device displays the meter image, and
at least one of the meter design file storage device and the meter image control device processes only the meter design file that includes authorization data.

2. The in-vehicle display apparatus according to claim 1, wherein
the meter design file storage device at least stores a standard meter design file, and
the meter image control device selects the standard meter design file at the time of occurrence of a malfunction.

3. The in-vehicle display apparatus according to claim 2, wherein
the meter design file storage device stores usage conditions respectively in association with the meter design files, the in-vehicle display device further comprising:

a change operating device that is operated by a user at the time when a meter design is changed and that is used to select a predetermined meter design; and a change control device that determines whether the data output from the vehicle data output device matches with the usage condition corresponding to the predetermined meter design selected by the user through operation of the change operating device, and, when the data matches with the usage condition, changes the meter design to the predetermined meter design.

4. The in-vehicle display apparatus according to claim 2, wherein the meter design file storage device stores usage conditions respectively in association with the meter design files, the in-vehicle display device further comprising:

a change condition input device through which a user inputs a change condition on which a meter design is changed to a predetermined meter design;

a change condition storage device that stores the input change condition; and a conditioned-response change control device that determines whether the input change condition matches with any one of the usage conditions, wherein when the change condition matches with any one of the usage conditions, the conditioned-response change control device stores the change condition in the change condition storage device, and when the change condition is satisfied, the conditioned-response change control device changes the meter design to the predetermined meter design.

5. The in-vehicle display apparatus according to claim 2, further comprising:

a communication device that communicates with a server to download the meter design files to the meter design file storage device.

6. A server managed by a device maker, comprising:

a communication device through which a plurality of meter design files that include data indicating that the device maker has authorized are uploaded to the server, wherein the uploaded meter design files in the server are downloaded to an in-vehicle meter design file storage device via the communication device.

7. The server according to claim 6, wherein usage conditions are respectively stored in association with the uploaded meter design files.

8. A communication method used in a system in which a first computer managed by a device maker, a second computer managed by a meter design creator and an in-vehicle computer are connected via a communication network, comprising:

transmitting a first electronic information for generating a meter design information, and a second electronic information, which determines whether a generated meter design information is suitable, from the first computer to the second computer;

transmitting a meter design information that is generated based on the first electronic information and determined as suitable by using the second electronic information, from the second computer to the first computer;

storing the meter design information in the first computer in such a manner that the meter design information is able to be transmitted to the in-vehicle computer, when the meter design information is authorized by the device maker; and transmitting the meter design information, corresponding to a request from a vehicle side, from the first computer to the in-vehicle computer.

9. A vehicle information display system comprising:

a server that stores meter design information that combines a meter design with an authorization code;

a control device that receives the meter design information from the server and that outputs only specified information;

a storage device that stores the specified information output from the control device;

a display image generating device that generates a display image on the basis of the specified information stored in the storage device; and a display device that displays the display image, wherein when the authorization code included in the meter design information is proper, the control device outputs the meter design as the specified information.

* * * * *

UNITED STATES PATENT AND TRADEMARK OFFICE
CERTIFICATE OF CORRECTION

PATENT NO. : 8,749,364 B2  
APPLICATION NO. : 13/664059  
DATED : June 10, 2014  
INVENTOR(S) : Yusuke Kamijo

Page 1 of 1

It is certified that error appears in the above-identified patent and that said Letters Patent is hereby corrected as shown below:

Title Page:

Item (56), col. 2, under Foreign Patent Documents, line 6, Delete "WO 2005-050121 A1 9/2005", Insert --WO 2005-080121 A1 9/2005--

Signed and Sealed this  
Twenty-third Day of December, 2014

Michelle K. Lee  
*Deputy Director of the United States Patent and Trademark Office*